(12) United States Patent
Herman et al.

(10) Patent No.: US 11,981,354 B2
(45) Date of Patent: May 14, 2024

(54) SYSTEMS AND METHODS FOR MITIGATING SPOOFING OF VEHICLE FEATURES

(71) Applicant: Ford Global Technologies, LLC, Dearborn, MI (US)

(72) Inventors: David Michael Herman, West Bloomfield, MI (US); Catherine Marie Amodeo, Livonia, MI (US); Yashanshu Jain, Dearborn, MI (US); Christopher Colarusso, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 17/657,661

(22) Filed: Apr. 1, 2022

(65) Prior Publication Data
US 2023/0311983 A1  Oct. 5, 2023

(51) Int. Cl.
*B60W 60/00* (2020.01)
*B60W 40/09* (2012.01)
(Continued)

(52) U.S. Cl.
CPC ........ *B60W 60/0059* (2020.02); *B60W 40/09* (2013.01); *B60W 40/12* (2013.01);
(Continued)

(58) Field of Classification Search
None
See application file for complete search history.

(56) References Cited

U.S. PATENT DOCUMENTS 8,433,507 B2  4/2013 Hannah et al.
9,173,100 B2  10/2015 Ricci
(Continued)

FOREIGN PATENT DOCUMENTS

CN  107735308 A  *  2/2018  ............. B62D 1/286
CN  107771146 A  *  3/2018  ............ B62D 5/0463
(Continued)

OTHER PUBLICATIONS

Zeinab El-Rewini et al., Cybersecurity Attacks in Vehicular Sensors, IEEE Sensors Journal, vol. XX, No. XX,, Apr. 2020, 1-16.
(Continued)

*Primary Examiner* — Kevin R Steckbauer
(74) *Attorney, Agent, or Firm* — Frank Lollo; Eversheds Sutherland (US) LLP

(57) ABSTRACT

Systems and methods for mitigating certain spoofing of vehicle features are disclosed herein. An example method can include determining input torque values obtained from a steering torque sensor associated with a steering wheel of a vehicle, wherein the input torque values are obtained over a period of time, determining road disturbances using a road disturbance model, applying a driver model that is indicative of human driver hands-on-wheel behaviors, determining when input torque values are indicative of a spoof or human interaction with the steering wheel using the input torque values, the road disturbance model, and the driver model, and executing a remediating measure when the input torque values are indicative of the spoof.

18 Claims, 7 Drawing Sheets

No Road Disturbances

Torque vs Time (Hands on Wheel)
• Quasi-Chaotic

Torque vs Time (Spoofing)
• Torque and Inertial Effect of Spoofing Object Coupled to Wheel Torque vs Time (off Wheel)
• Torque Response of System, Small Noise Steering Wheel Angle vs Time Applied by ADA (Power Steering)

(51) Int. Cl.
    *B60W 40/12* (2012.01)
    *B62D 15/02* (2006.01)

(52) U.S. Cl.
    CPC ..... *B62D 15/021* (2013.01); *B60W 2420/403* (2013.01); *B60W 2510/0657* (2013.01)

(56) References Cited

U.S. PATENT DOCUMENTS

| | | | |
|---|---|---|---|
| 9,238,478 B2 * | 1/2016 | Moretti | B62D 6/08 |
| 9,475,521 B1 * | 10/2016 | Fung | B62D 15/025 |
| 10,160,484 B2 * | 12/2018 | Lee | B62D 6/00 |
| 10,889,319 B2 * | 1/2021 | Moulaire | B62D 6/008 |
| 11,079,756 B2 * | 8/2021 | Herman | A61B 5/02455 |
| 11,312,298 B2 * | 4/2022 | Farrell | G06N 20/00 |
| 11,447,176 B2 * | 9/2022 | Hwang | B60W 50/08 |
| 11,752,938 B2 * | 9/2023 | Kim | B60Q 9/00 |
| | | | 340/439 |
| 2010/0228417 A1 * | 9/2010 | Lee | B62D 15/025 |
| | | | 701/23 |
| 2015/0151784 A1 * | 6/2015 | Moretti | B62D 15/024 |
| | | | 701/41 |
| 2015/0217687 A1 * | 8/2015 | Colvin, Sr. | B60K 28/066 |
| | | | 180/272 |
| 2018/0134309 A1 * | 5/2018 | Moulaire | B62D 5/0463 |
| 2018/0154936 A1 * | 6/2018 | Yamasaki | B62D 15/0285 |
| 2018/0326992 A1 * | 11/2018 | Aoi | G06V 20/597 |
| 2020/0017141 A1 * | 1/2020 | Moreillon | B62D 1/286 |
| 2020/0050194 A1 * | 2/2020 | Choi | B60W 40/09 |
| 2020/0108853 A1 * | 4/2020 | Moreillon | B62D 7/09 |
| 2020/0189655 A1 * | 6/2020 | Ahn | B60W 50/08 |
| 2020/0285231 A1 * | 9/2020 | Herman | B60Q 9/00 |
| 2020/0353978 A1 * | 11/2020 | Hwang | B60W 50/08 |
| 2021/0200207 A1 | 7/2021 | Soryal et al. | |
| 2021/0233397 A1 | 7/2021 | Zhang | |
| 2022/0194294 A1 * | 6/2022 | Kim | B60Q 9/00 |
| 2023/0286550 A1 * | 9/2023 | Shahriari | B60W 60/0059 |
| 2023/0311983 A1 * | 10/2023 | Herman | B60W 40/12 |

FOREIGN PATENT DOCUMENTS

| | | | | |
|---|---|---|---|---|
| CN | 107735308 B | * | 10/2019 | ............. B62D 1/286 |
| CN | 111017007 A | * | 4/2020 | ............. B60G 11/18 |
| CN | 111667667 A | * | 9/2020 | ........... A61B 5/0077 |
| CN | 114643997 A | * | 6/2022 | ............... B60Q 9/00 |
| CN | 109823345 B | * | 4/2023 | |
| CN | 116653981 A | * | 8/2023 | ......... B60R 16/0232 |
| CN | 116767237 A | * | 9/2023 | ............ B60W 40/09 |
| CN | 116890851 A | * | 10/2023 | ............ B60W 40/09 |
| DE | 102009028647 A1 * | | 2/2011 | ........... B62D 15/025 |
| DE | 102010013243 A1 * | | 9/2011 | ............ B60W 40/08 |
| DE | 102012012307 A1 * | | 12/2013 | .......... B62D 5/0472 |
| DE | 102014117820 A1 * | | 6/2016 | ............. B62D 1/046 |
| DE | 112016002795 T5 | * | 3/2018 | ............. B62D 1/286 |
| DE | 102016013587 A1 * | | 5/2018 | |
| DE | 102017203735 A1 * | | 9/2018 | |
| DE | 102017210966 A1 * | | 1/2019 | |
| DE | 102020105566 A1 * | | 9/2020 | ........... A61B 5/0077 |
| DE | 102021203951 A1 * | | 10/2022 | |
| DE | 102022134327 A1 * | | 8/2023 | ......... B60R 16/0232 |
| DE | 102022126301 A1 * | | 9/2023 | ............ B60W 40/09 |
| DE | 102023106366 A1 * | | 10/2023 | ............ B60W 40/09 |
| EP | 2676867 A2 | * | 12/2013 | .......... B62D 5/0472 |
| EP | 2676867 B1 | * | 12/2015 | .......... B62D 5/0472 |
| EP | 3569476 A1 | * | 11/2019 | ............ B62D 5/046 |
| EP | 3636516 A1 | * | 4/2020 | ............. B60G 11/18 |
| EP | 3227161 B1 | * | 7/2020 | ............. B62D 1/046 |
| EP | 3569476 B1 | * | 5/2021 | ............ B62D 5/046 |
| EP | 3636516 B1 | * | 7/2021 | ............. B60G 11/18 |
| EP | 4015348 A1 | * | 6/2022 | ............... B60Q 9/00 |
| JP | 2017007484 A | * | 1/2017 | ............. B62D 1/286 |
| JP | 6722355 B2 | * | 7/2020 | ............... B60Q 9/00 |
| WO | WO-2011020631 A1 * | | 2/2011 | ........... B62D 15/025 |
| WO | WO-2016208399 A1 * | | 12/2016 | ............. B62D 1/286 |
| WO | WO-2018161980 A1 * | | 9/2018 | ............... B60Q 9/00 |
| WO | WO-2022223177 A1 * | | 10/2022 | |

OTHER PUBLICATIONS

Yasser Shoukry et al., Non-Invasive Spoofing Attacks for Anti-Lock Braking Systems, G. Gertoni and J-S. Coron (Eds): CHES 2013, LNCS 8086, pp. 5572, 2013.

* cited by examiner

| Load Position | Torsion (N mm) | Rotation (°) | Bending Moment (N mm) |
|---|---|---|---|
|  | 640 | 0.30 | 313 |
|  | 470 | 0.21 | 504 |
|  | 4.6 | 0.0 | 518 |

SYSTEMS AND METHODS FOR MITIGATING SPOOFING OF VEHICLE FEATURES

BACKGROUND

A spoof is an action taken to mimic or masquerade. In the context of vehicles, a spoof can involve an action that is intended to mimic driver or passenger behavior(s) for a particular purpose. Some spoofs may be caused by vehicle occupants in order to override certain vehicle features. For example, a vehicle may have advanced driver assistance system (ADAS) features such as full or partial steering assistance, automatic braking, and so forth providing driver assistance, partial and conditional automation of driving tasks. In some instances, usage of these features can require periodic driver input. For example, periodic driver input to a steering wheel, indicating that the driver's hands are on the steering wheel, may be required for the continual use of steering assistance features by ensuring driver alertness, awareness of driving environment, and ability to resume some or all driving functions. In certain instances, these features may be primarily overridden by a sudden driver input or disengaged when conditions for the feature are not met. For example, an accident-avoidance maneuver or transitioning to a road with poor lane markings. A driver may be tempted to spoof the ADAS system with input that mimics the expected input. However, spoofed input can cause unintended effects.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
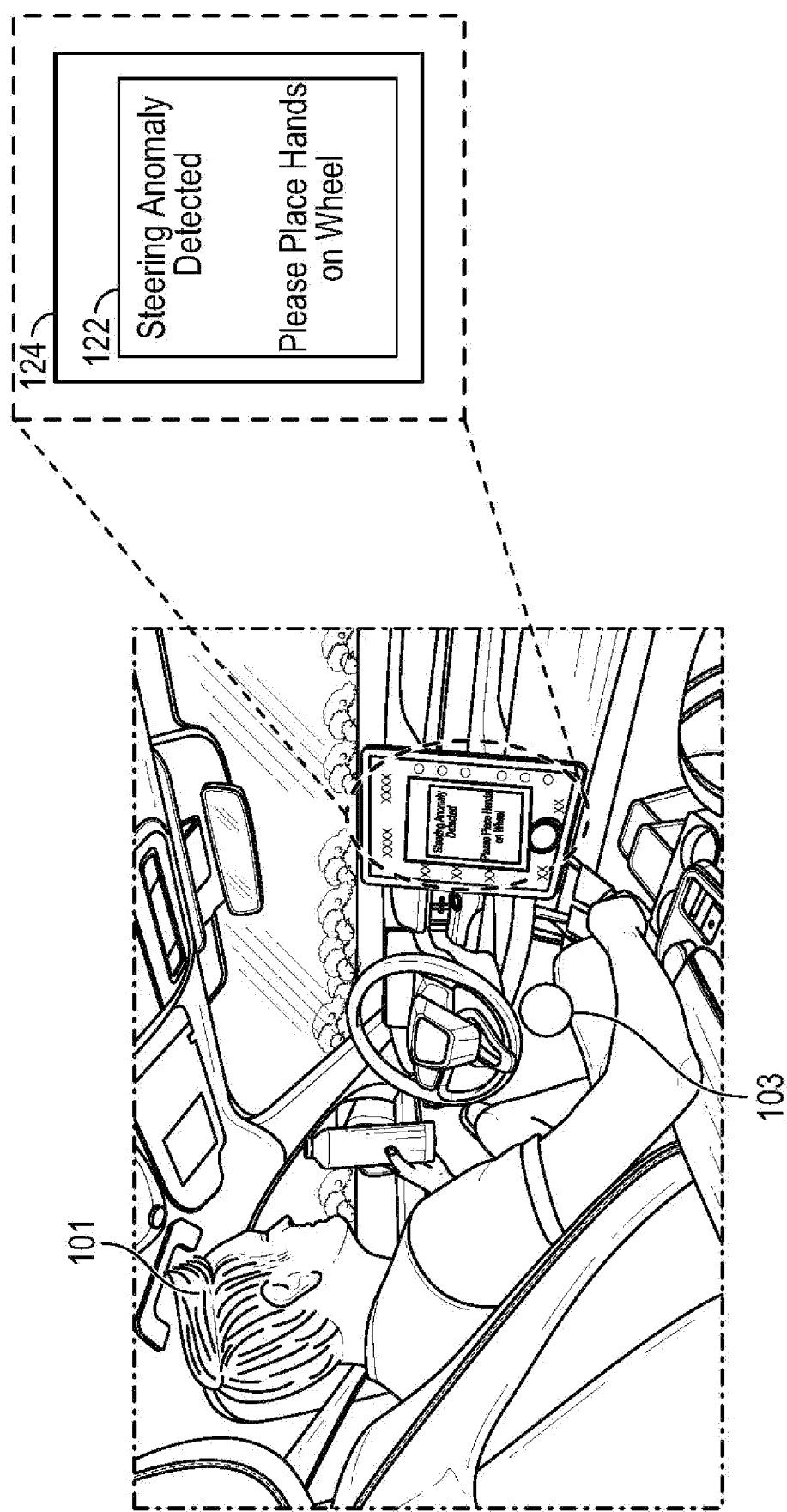
FIG. 1 illustrates an example environment where aspects of the present disclosure may be practiced.
Figure 1:
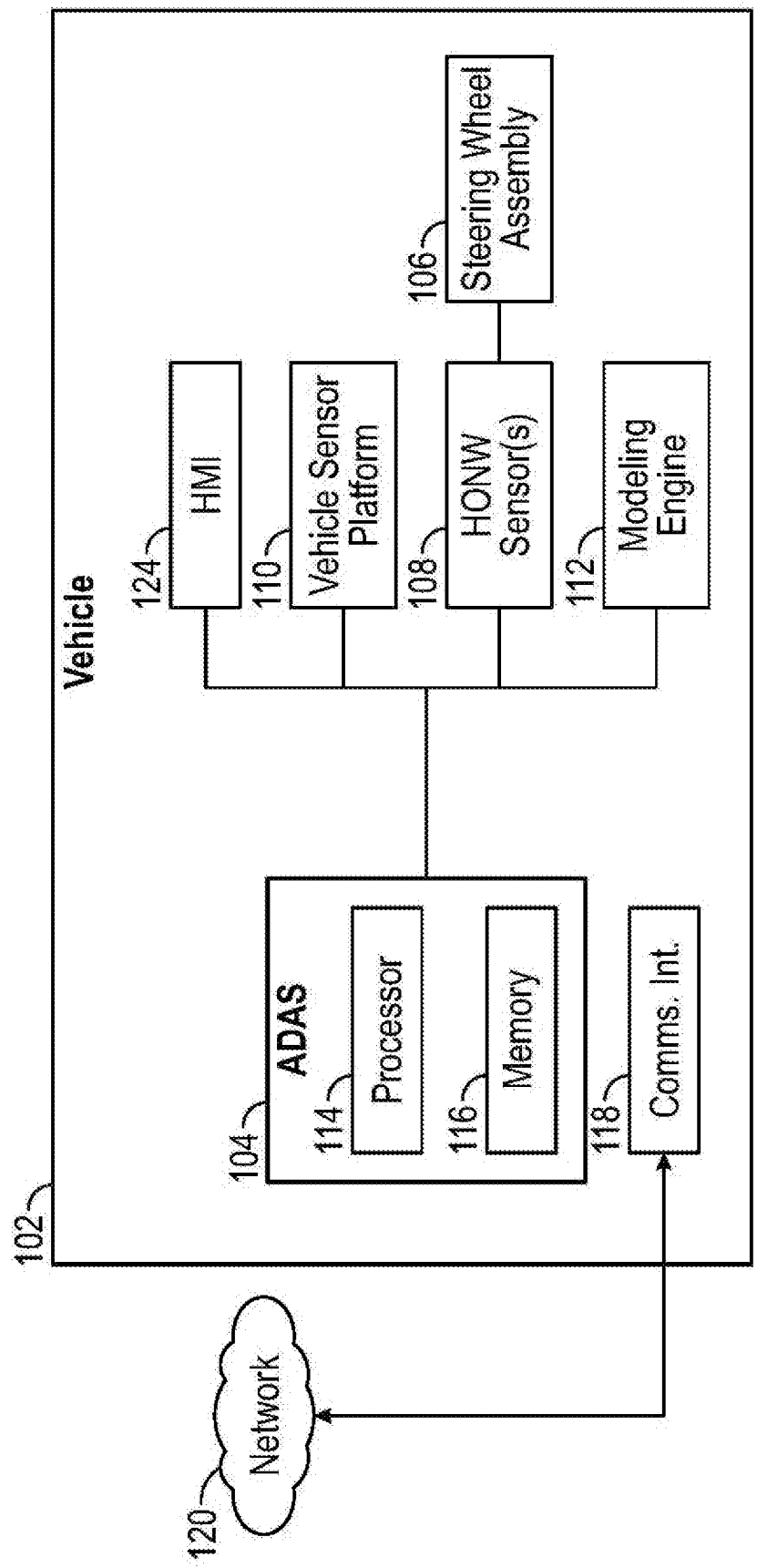

The present disclosure pertains to the detection and mitigation of certain spoof events related to vehicle operations. For example, systems and methods can be used to determine hands-on wheel (HONW) spoofing in vehicles. When human hands are placed on a steering wheel, they apply torque that can be detected by sensors in the steering column even when the driver's input does not diverge from the present steering wheel angle. ADAS systems often require periodic confirmation of driver hands on wheel based on torque sensing. Often ADAS features incorporate automated steering where the driver is required to maintain periodic hands on wheel detection but does not intend to deactivate ADAS through steering inputs that significantly diverge from the ADAS feature input. Hands-on-wheel detection may be further confounded by torque induced in the steering assembly from road disturbances as well as by spoofing events, such as applying steering wheel torque through affixing objects to the steering wheel or by applying resistive torque to the steering wheel through friction on the steering wheel and an object. To prevent this type of spoofing, an example system leverages static and dynamic properties of the steering wheel assembly that can be measured and interrogated during vehicle usage. In addition to the steering wheel assembly, other vehicle components responsible, directly or indirectly, for vehicle steering can be monitored.

An example method may include monitoring input signals to the steering assembly, which are likely generated inside the vehicle by a driver or other objects. These inputs can be measured over time and used for historical analyses. The method can also include detecting road conditions (e.g., road disturbances), which may apply external or indirect input to the steering assembly. Vehicle acceleration, turning, or other noise may cause a change in sensed torque and/or steering angle relative to the steering assembly.

An example system can detect and filter noise using methods known in the arts as well as incorporating vehicle sensors to predict torque-on-wheel (or other equivalents based on steering input mechanism type) values. For example, the system can feed a road profile and speed signals into a classical algorithm, neural network (NN) or other machine-learning algorithm to create a baseline road disturbance torque on the wheel and determine how those data change over time. An example system or method can apply a pre-generated steering model. Generally, there is a defined response at the steering wheel and there is an expected reaction from the driver. Larger vehicle events can be evaluated to differentiate driver hands on wheel (HONW) events from spoofing attacks. Again, an analytical model, neural network, gradient boosted tree, anomaly detection algorithms, and the like may be used. Statistical transformations and/or tests may be applied as well.

A driver behavior model can be used in some instances. Some drivers may apply different magnitudes and distributions of torque to the steering wheel under varying time intervals. These driving inputs may be chaotic, correlated with driving task, and/or representative of a specific driver behavior. The vehicle may predict a path plan based on a human-based driver model using vision and/or sensor fusion/tracking data (e.g., time-to-collision (TTC), occupancy grid, dynamic occupancy grid) and predict expected torque-on-wheel to achieve a general or driver-specific path plan.

The systems and methods can utilize a spoofing, HONW, hands-off-wheel (HOFW) algorithm (could be an analytical model or other equivalent). The algorithm can include any one or more of an analytical equation, neural network, gradient boost tree algorithm, and so forth—just to name a few. The algorithm can be seeded and improved using training data from multiple drivers and driver behaviors as well as data from different types of spoofing solutions (e.g., use of a water bottle, weight, toy (e.g., rubber duckie), etc.). Generally, it is assumed that a torque profile of human driver input and that of a spoofing object is fundamentally different (random/chaotic/correlated with driving task vs functional output based on time history). Further, a spoofing object would likely show a repeatable set of behaviors based on physical parameters in the environment such as vehicle acceleration, steering wheel angle, wheel angle change, road crown, vehicle speed, lateral acceleration, yaw rate and so forth. Further, a driver may choose to leave a spoofing device always attached to the wheel, during both manual and automated driving, where the wheel torque input would be additive of the driver input and spoofing device.

Spoofing technologies may incorporate motors to cause a time-varying quasi-random torque. This may be detected using audio detection of potential spoofing noises. The sounds may be localized based on a microphone array and steering angle. Capacitive sensors in the steering wheel may also be used to detect time-varying signals of quasi-random torque. The weakness of this spoofing attack is that it would be insensitive to road environments (e.g., the driver being nervous and moving/adjusting their hands on the steering wheel, requests to touch wheel, vehicle HMI inputs) or vehicle requests. Additionally, it would not reflect the specific driver behavior characteristic of the present driver, such as time between wheel inputs, wheel input magnitude, etc. In some instances, the ADAS can cause the display of a warning that informs the driver to place hands on the steering wheel to confirm a change in the torque. An example system or method can execute a remediating measure such as alert driver as to current torque conditions, slow down the vehicle, deactivate ADAS features, and the like. In one example, a warning can be displayed on a human-machine interface (HMI). For example, if the vehicle is in a fully or semi-autonomous mode of steering where the ADAS executing steering maneuvers to center the vehicle in a lane during travel, the ADAS may warn the driver that the vehicle will be taken out of the fully or semi-autonomous mode of steering.

The Society of Automotive Engineers (SAE) defines six levels of driving automation ranging from Level 0 (fully manual) to Level 5 (fully autonomous). These levels have been adopted by the U.S. Department of Transportation. Level 0 (L0) vehicles are manually controlled vehicles having no driving related automation. Level 1 (L1) vehicles incorporate some features, such as cruise control, but a human driver retains control of most driving and maneuvering operations, Level 2 (L2) vehicles are partially automated with certain driving operations such as steering, braking, and lane control being controlled by a vehicle computer. The driver retains some level of control of the vehicle and may override certain operations executed by the vehicle computer, Level 3 (L3) vehicles provide conditional driving automation but are smarter in terms of having an ability to sense a driving environment and certain driving situations. Level 4 (L4) vehicles can operate in a self-driving mode and include features where the vehicle computer takes control during certain types of equipment events. The level of human intervention is very low. Level 5 (L5) vehicles are fully autonomous vehicles that do not involve human participation. The ADAS can be configured to allow any or all of these levels of autonomous operation, as well as restrict these modes to mitigate a spoof.

It will be understood that a spoofing attack may have a specific set of functional relationships between the vehicle state and torque sensors. On the other hand, the driver torque input can be quasi-chaotic where the torque amount varies, as well as timing. A driver model and path prediction model may be used to correlate torque inputs with predicted driving behavior. Even in the worst-case scenario of a spoofing attack by a device that applies random torque values intermittently, such events may be detected as these events add a physical weight to some portion of the steering wheel that can be detected, even in the presence of noise created by random torque inputs. Further, the torque inputs may not be correlated with human driving predictions. A torsional response of steering column over time using a dynamic solver (useful for a hanging weight swinging, inertia of steering wheel, and the like) can be used to identify a spoof.

Illustrative Embodiments

Turning now to the drawings, FIG. 1 depicts an illustrative architecture 100 in which techniques and structures of the present disclosure may be implemented. The architecture 100 includes a vehicle 102 that comprises an ADAS 104, a steering wheel assembly 106, a HONW sensor(s) 108, a vehicle sensor platform 110, and a modeling engine 112.

Generally, a driver 101 is operating the vehicle 102. The driver 101 may attempt to spoof input to the steering wheel assembly 106 by associating an object 103 with the steering wheel assembly 106. The steering wheel assembly 106 can include a steering wheel coupled with a steering linkage, but is not so limited. The steering wheel assembly 106 could include a yoke, a joystick, or other similar steering input mechanism. In some instances, the steering wheel assembly 106 may be referred to as a steering input mechanism.

The driver 101 may want to mimic HONW input to the steering wheel assembly 106 that would ordinarily be used by the ADAS 104 to enable autonomous driving features. That is, the ADAS 104 may enable a semi- or completely autonomous driving mode where the output from the vehicle sensor platform 110 can be used to automatically steer the vehicle 102. The ADAS 104 can also provide steering guidance or other levels of autonomy. In some instances, activation and/or continued use of these autonomous features may be based on the driver having their hands on the steering wheel.

The ADAS 104 can comprise a processor 114 and memory 116. The processor 114 executes instructions stored in memory 116 to perform any of the methods disclosed herein. When referring to actions performed by the ADAS 104, it will be understood that this includes execution of instructions by the processor 114. The vehicle 102 can also comprise a communications interface 118 that allows the ADAS 104 to access a network 120. The network 106 can include combinations of networks. For example, the network 120 may include any one or a combination of multiple different types of networks, such as cellular, cable, the Internet, wireless networks, and other private and/or public networks. The network 120 can include either or both short and long-range wireless networks.

In some instances, a spoof attack may be lodged against the vehicle 102 over the network 120. For example, a spoofer may attempt to control the vehicle 102 remotely by transmitting spoofing commands over the network 120 to the vehicle 102, as will be discussed in greater detail herein. While implementations disclosed herein contemplate use of the ADAS 104 to perform spoof detecting and mitigation, a standalone or dedicated controller can also be used. That is, the spoof detecting and mitigation features attributed to the ADAS herein can be performed by a dedicated controller, which can control operations of the ASDS.

The ADAS 104 can be configured to obtain and monitor steering input from the steering wheel assembly 106 over time. For example, torque forces generated by a hand or hands of the driver on the steering wheel assembly 106 can be sensed using the HONW sensor(s) 108. In other examples, HONW sensor(s) can include capacitive sensors can be used to detect when the driver's hands are on or off the wheel, as well as the various aspects of spoof detection disclosed above. In addition to monitoring steering wheel torque, other parameters such as steering wheel angle can also be measured.

The ADAS 104 can also detect road conditions using the vehicle sensor platform 110. In general, the vehicle sensor platform 110 can include a plurality of different types of sensors such as cameras, microphones, capacitive sensors, radar, ultrasonic, LiDAR, accelerometers, and the like. For example, road conditions and features can be identified from images obtained from forward-facing cameras of the vehicle sensor platform 110. It will be understood that while cameras have been disclosed, other similar image or object detecting sensors can be used. Road conditions can be obtained from maps or other road informational sources. It will be understood that road conditions may create noise such as jarring or vibration that is sensed by the HONW sensor(s) 108. As noted above, vehicle acceleration, turning, or other noise may cause a change in sensed torque and/or steering angle relative to the steering wheel assembly. For example, the ADAS 104 can monitor the output of an onboard accelerometer of the vehicle sensor platform 110 to detect jarring from road bumps or other similar road features. In some instances, the ADAS 104 is configured to generate a road disturbance model from images obtained from the camera. That is, the ADAS 104 using the modeling engine 112, which applies image processing logic to detect road disturbances in the images.

Acceleration forces exerted on the vehicle and into the steering wheel assembly 106 may cause a change in sensed torque and/or steering angle that can be detected by the ADAS 104. The ADAS 104 can be configured to detect and filter this noise using methods known in the arts as well as incorporating vehicle sensors to predict torque on the wheel. For example, the ADAS 104 can utilize a road profile in combination with a speed signal. The ADAS 104 can evaluate these data by executing the modeling engine 112, which can apply a neural network to produce a baseline road disturbance torque on the wheel.

The modeling engine 112 can also be executed by the ADAS 104 to apply a steering model. In general, a steering model can comprise a measurement of steering angle, wheel angle, and lateral forces. Steering angle pertains to an angle of the steering wheel due to the driver turning the steering wheel. Wheel angle relates to the angle of the steering wheel column and/or steering wheel (e.g., tilted towards or away from the driver). Lateral forces may be exerted on the steering wheel assembly when the vehicle is driven around curves or embankments at certain speeds.

In some instances, a steering model can be used to identify distinct interactions between road profile inputs and expected user responses. It will be understood that there may exist a defined response that is sensed at the steering wheel and there is an expected reaction from the driver. Evaluation of larger vehicle events would be able to differentiate true HONW signals from spoofing events.

Figure 2A:
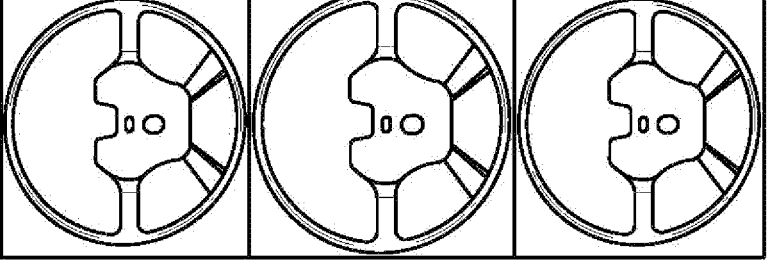
FIGS. 2A and 2B is a graph of torsional response of a steering column over time using a dynamic solver.
Figure 2A:
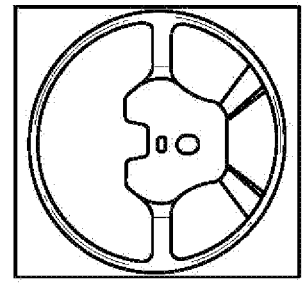
Figure 2A:
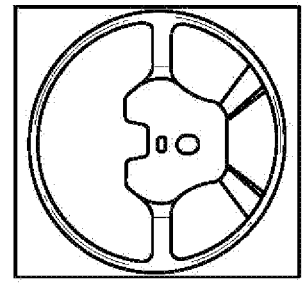
Figure 2A:
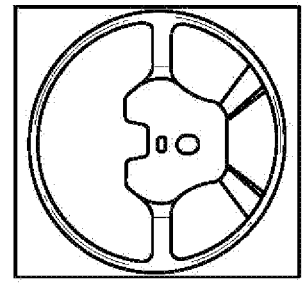

Referring briefly to FIGS. 1 and 2A, the ADAS 104 can also execute the modeling engine 112 to apply a driver behavior model. It will be understood that drivers may apply different magnitudes and distributions of torque to the steering wheel assembly 106 under varying time intervals. For example, present spoofing technology is typically the use a fixed weight attached to a fixed point on the steering column that would apply a torque to the steering wheel as a function of object mass, location on wheel, wheel angle and vehicle acceleration that is easily modeled. FIG. 2A illustrates a table 200 of different resulting torques and corresponding wheel rotations for spoofing object at different locations on the steering wheel, (3 o'clock, 5 o'clock, and 6 o'clock positions).

The modeling engine 112 can predict a path plan based on a human driver model using vision and/or sensor fusion/tracking data (e.g., TTC, occupancy grid, dynamic occupancy grid). That is, the sensor output can be obtained from the vehicle sensor platform 110 and used to predict the required torque-on-wheel to achieve a general or driver-specific path plan.

The ADAS 104 can detect spoofing by applying a HONW, HOFW algorithm. This algorithm can include an analytical equation, neural network, gradient boost tree algorithm, or other logical constructs. To develop the algorithm, training data can be obtained from a number of drivers. Driver behaviors and types of spoofing solutions may be used. For example, spoofing profiles can be generated by evaluating common spoofing inputs to the steering wheel assembly. In one example, as illustrated in FIG. 1, the object 103 attached to the steering wheel assembly 106 can be modeled in terms of torque values and wheel angle over time. Another example includes when a water bottle or other object is used to apply pressure to a certain part of the steering wheel to mimic torque or angular forces produced by a human hand(s). Again, in general, any spoofing type can be modeled.

It will be understood that a torque profile of a human driver and that of a spoofing object is fundamentally different. In most instances, the torque created by a human is random/chaotic and functional output based on time/historical/driving environment data. A spoofing object, even when motorized, would show a repeatable set of behaviors based on physical parameters in the environment such as vehicle acceleration, steering wheel angle, wheel angle rate of change, and so forth—just to name a few.

In some instances, the ADAS 104 can be configured to detect spoofing due to spoofing technologies incorporated into the vehicle. For example, spoofing technologies may incorporate motors to cause a time-varying quasi-random torque. This may be detected using audio detection of potential spoofing noises. The sounds may be localized based on a microphone array and steering angle. Capacitive sensors may also be used to detect time-varying signals of quasi-random torque. It will be understood that capacitive contact is a function of grip strength.

The audio sensors such as microphones and capacitive sensors car included in the vehicle sensor platform 110. Again, the weakness of this spoofing attack is that it would be insensitive to road environments (e.g., driver being nervous and moving/adjusting their hands on wheel) or vehicle requests. In some instances, the ADAS 104 can display a warning to instruct the driver to place their hands on the steering wheel to confirm a change in the torque. For example, the ADAS 104 can request the driver to apply pressure to the steering wheel.

In one example, as best illustrated in FIG. 1, a warning 122 can be displayed on a human-machine interface (HMI) 124. In one example, the remediating measure includes causing the ADAS 104 to slow the vehicle or deactivate a fully or semi-autonomous mode of steering. For example, if the vehicle is in fully or semi-autonomous mode of steering where the ADAS 104 executing steering maneuvers to center the vehicle in a lane during travel, the ADAS 104 may warn the driver that the vehicle will be taken out of the fully or semi-autonomous mode of steering.

In sum, a spoofing attack typically has a specific functional relationship between vehicle state and torque sensors.

On the other hand, the driver torque input may typically be quasi-chaotic where the torque amount can vary as well as timing. A driver model and path prediction model may be used to correlate torque inputs with predicted driving behavior. Even in the worst-case scenario of a spoofing attack by a device which applies random torque values intermittently, such events can be easily detected as they add a physical weight to some portion of the steering wheel which can be detected even with the "noise" of the random torque inputs. Further, the torque inputs likely will not correlate with human driving predictions. In some instances, the ADAS 104 can be configured to detect a weight location (relative location on a steering wheel) and mass, as well as rotation of the steering wheel caused by a fixed weight applied to a point on a steering wheel or other similar spoofing techniques. Further, the properties of the spoofing device can be predicted such as fixed mass, viscous liquid, motorized, etc. In addition, the vehicle may set communicate to a central server with information on spoofing device detection. In one example, when the vehicle is enabled with motorized steering for lane centering, upon startup, the wheel may jerk slightly as the motors initiate. This initiation point may be used as a trigger to use sensing to detect a spoofing device.

In some instances, additional vehicle features can be measured and used to determine spoofing events. For example, other types of driver sensors such as seat belts, seat weight sensing, seat configuration, driver state monitoring camera, capacitive sensor, and the like can also be used to detect spoofing. In some configurations, HONW and spoofing events can be detected and/or corroborated by fusing interior camera hand detection with HONW logic of present disclosure.

Figure 2B:
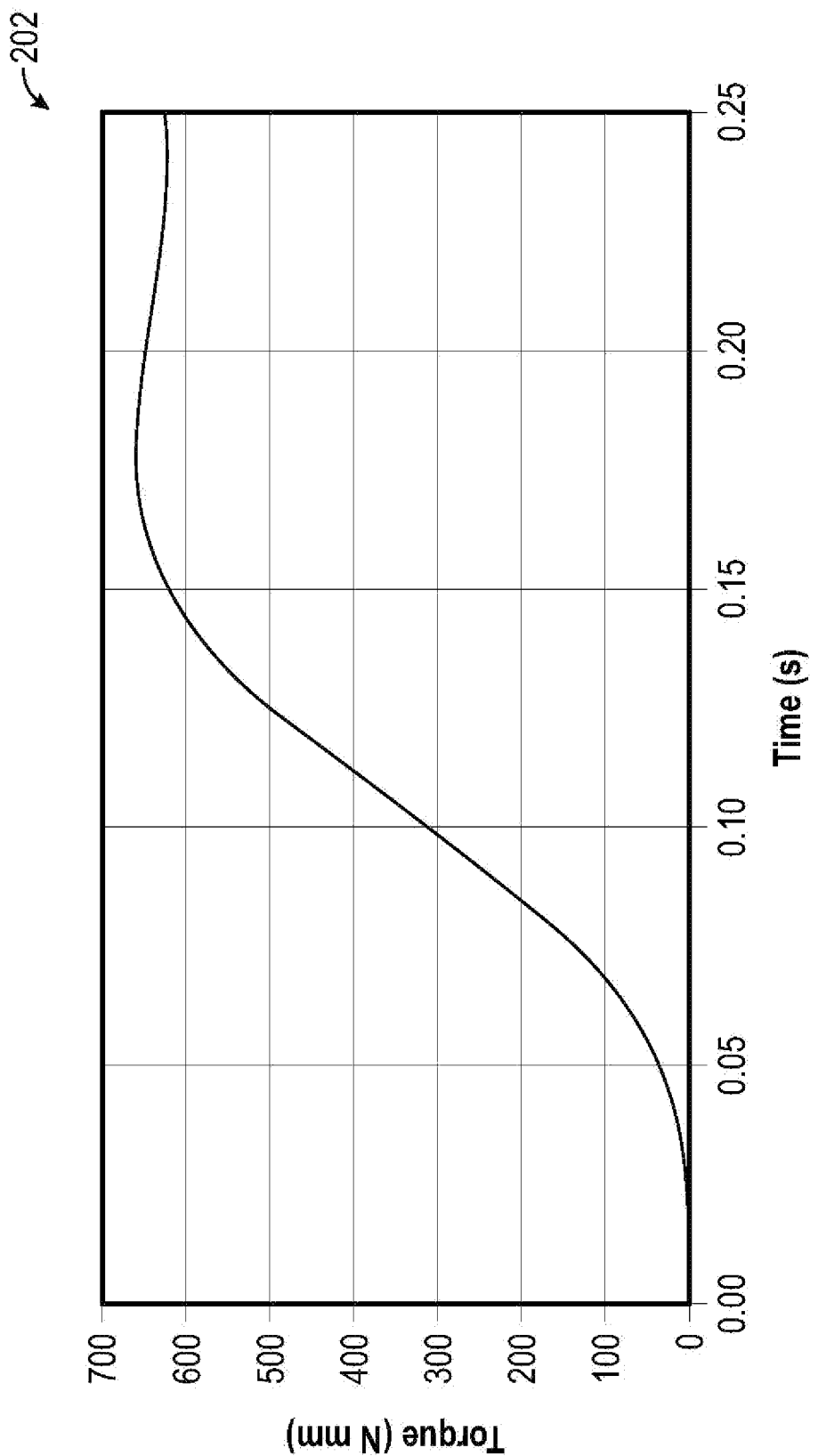

FIG. 2B is a graph 202 of torsional response of a steering column over time using a dynamic solver. This analysis is useful in detecting spoofing events associated with a hanging weight swinging, the inertia exerted against the steering wheel, and so forth. In the present model, a weight was applied to a steering wheel and equilibrated over 0.2 seconds. The steady response after equilibrium time is in contrast to human input for which the force applied would have more lateral contribution and be more chaotic in magnitude and applied direction. More complex FEA (finite element analysis) models can be used over a range of conditions (e.g., spoofing object type, wheel angle history, power steering torque response such as in ADAS).

Figure 3:
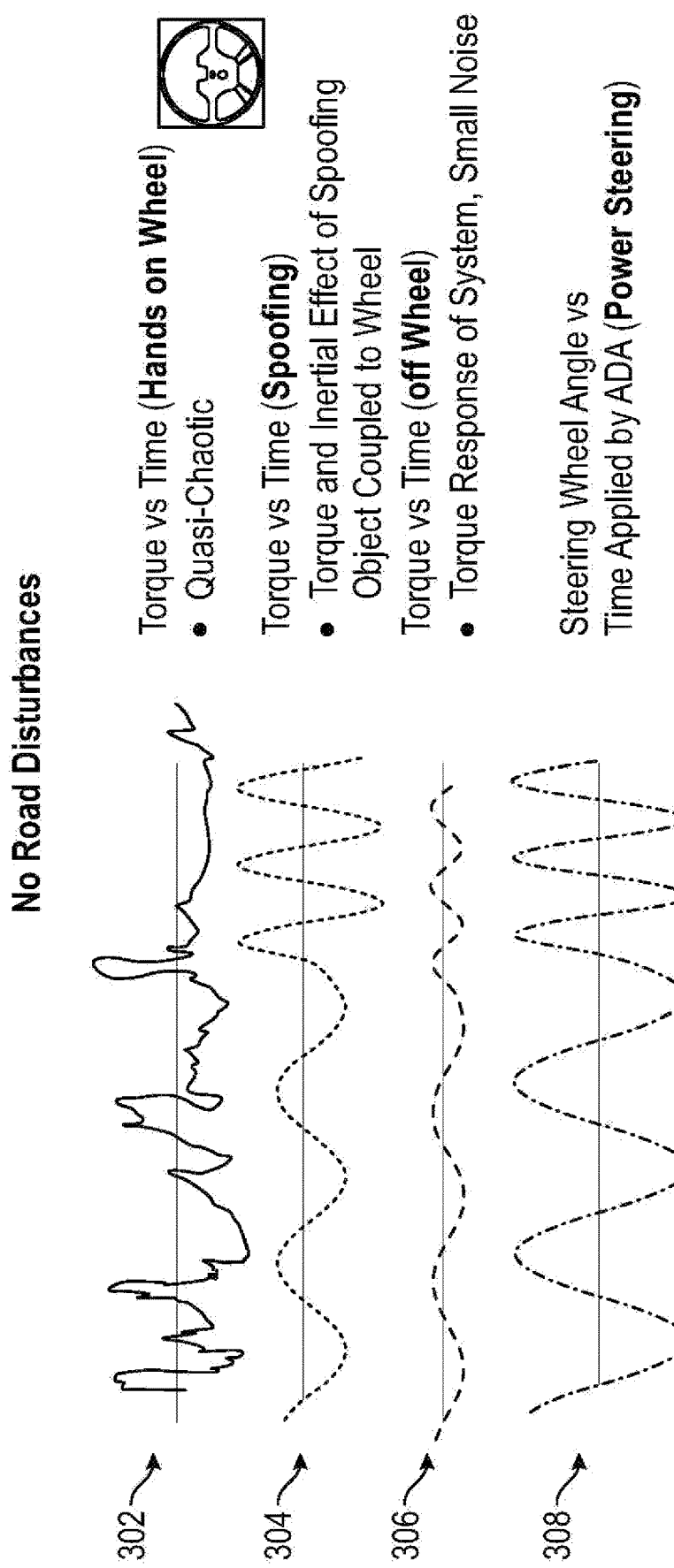
FIG. 3 is a graph illustrating various steering wheel input responses under various conditions.

FIG. 3 is a graph illustrating various steering wheel responses under different conditions. It will be understood that graphs in FIGS. 3 and 4 assume that there has been a calculation and canceling of the steering system mechanical response and momentum behavior to vehicle acceleration and mechanical excitations.

In more detail, the graph illustrates instances of large and relatively fast motion of the steering wheel and the torque response of the wheel under various conditions. In graph segment 302, torque values are illustrated over time for human driver input. The data points, when connected, illustrate the quasi-chaotic nature of human driver input (HONW input). Graph segment 304 illustrates torque values when a spoofing technique is used. That is, the torque and inertial values are indicative of an object that is applying cyclical input (not quasi-random). Graph segment 306 illustrates torque values relative to time for HOFW events, where torque values are low and are indicative of noise (e.g., road imperfections, inertia from turning vehicle, and so forth). Also, in the HOFW condition, noise of the momentum of the steering wheel itself is not filtered, which may be 0 after filtering. This is to show the increasing momentum of the steering wheel due to the weight on the wheel when the spoofing device is attached.

Graph segment 308 illustrates steering wheel angle over time applied by an advanced driver assistance system (e.g., power steering). It is assumed that the ADAS 104 is providing a command to move the steering wheel under various sinusoidal patterns of different rates.

Figure 4:
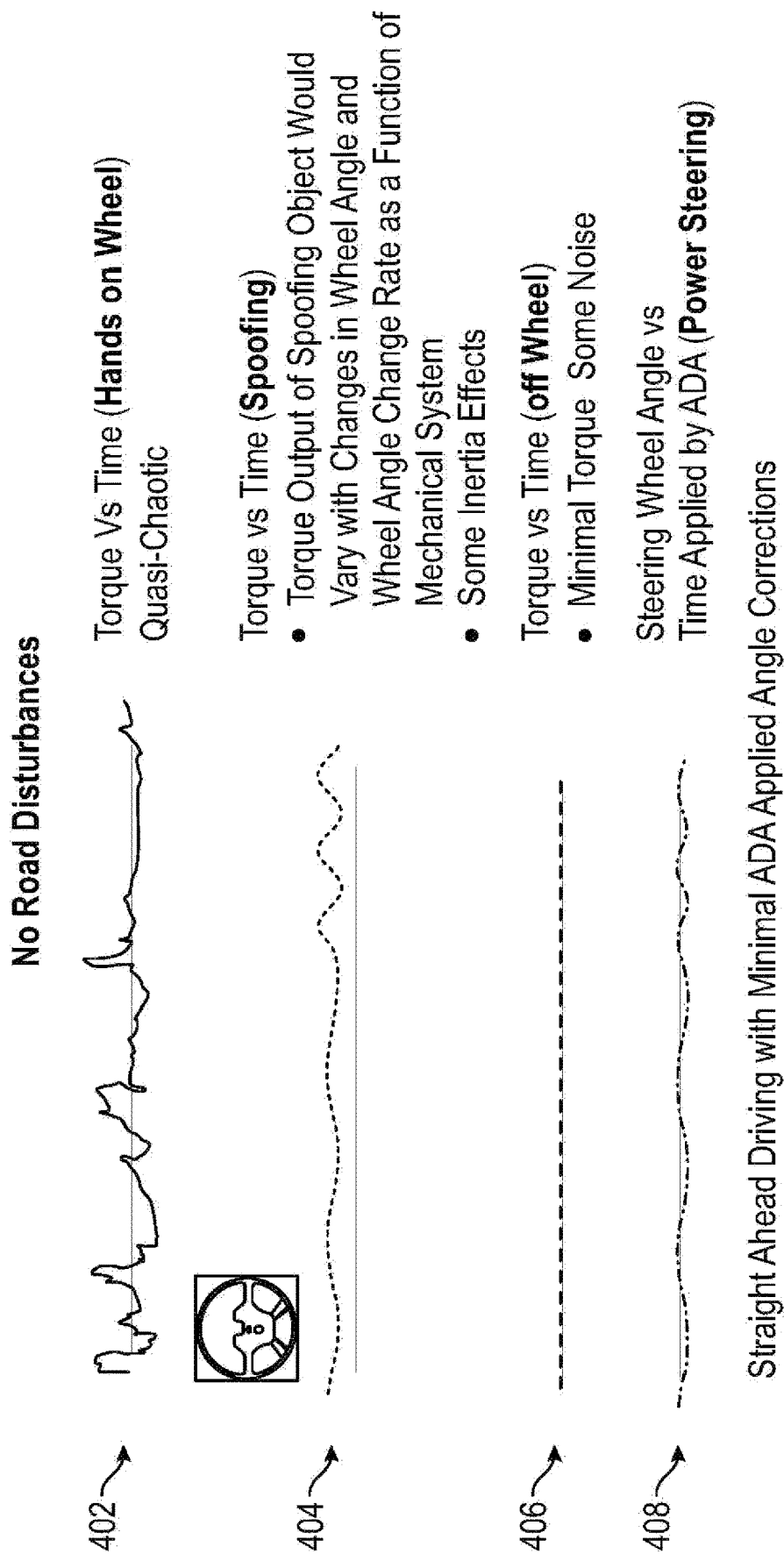
FIG. 4 is another graph illustrating various steering wheel input responses under different conditions.

FIG. 4 is a graph that illustrates examples of limited motion of steering wheel where driving is mostly straight. In these examples, the torque response of the wheel under various conditions (spoofing vs hands off wheel vs hands on wheel will look very different) can be differentiated. Notably, depending on the spoofing object location, a constant torque varying with wheel angle can be easily differentiated. It is assumed that the vehicle is providing a command to move the wheel under various sinusoidal patterns of different rates but mostly driving straight. Also, in the HOFW condition, noise of the momentum of the wheel itself is not filtered, which will be 0 after filtering. This is to show the increasing momentum of the wheel due to a weight on the wheel when a spoofing device is attached.

Graph segment 402 illustrates the quasi-random torque values generated by a human. Graph segment 404 illustrates torque responses over time when a spoofing event is occurring. The wave pattern is induced when the object moves due to changes in wheel angle θ (magnitude of wheel turning) and wheel angle rate of change $$\frac{d\theta}{dt}$$

(how fast the steering wheel is being turned). Segment 406 is related of HOFW events, and segment 408 illustrates torque responses due to ADAS automated steering input.

Figure 5:
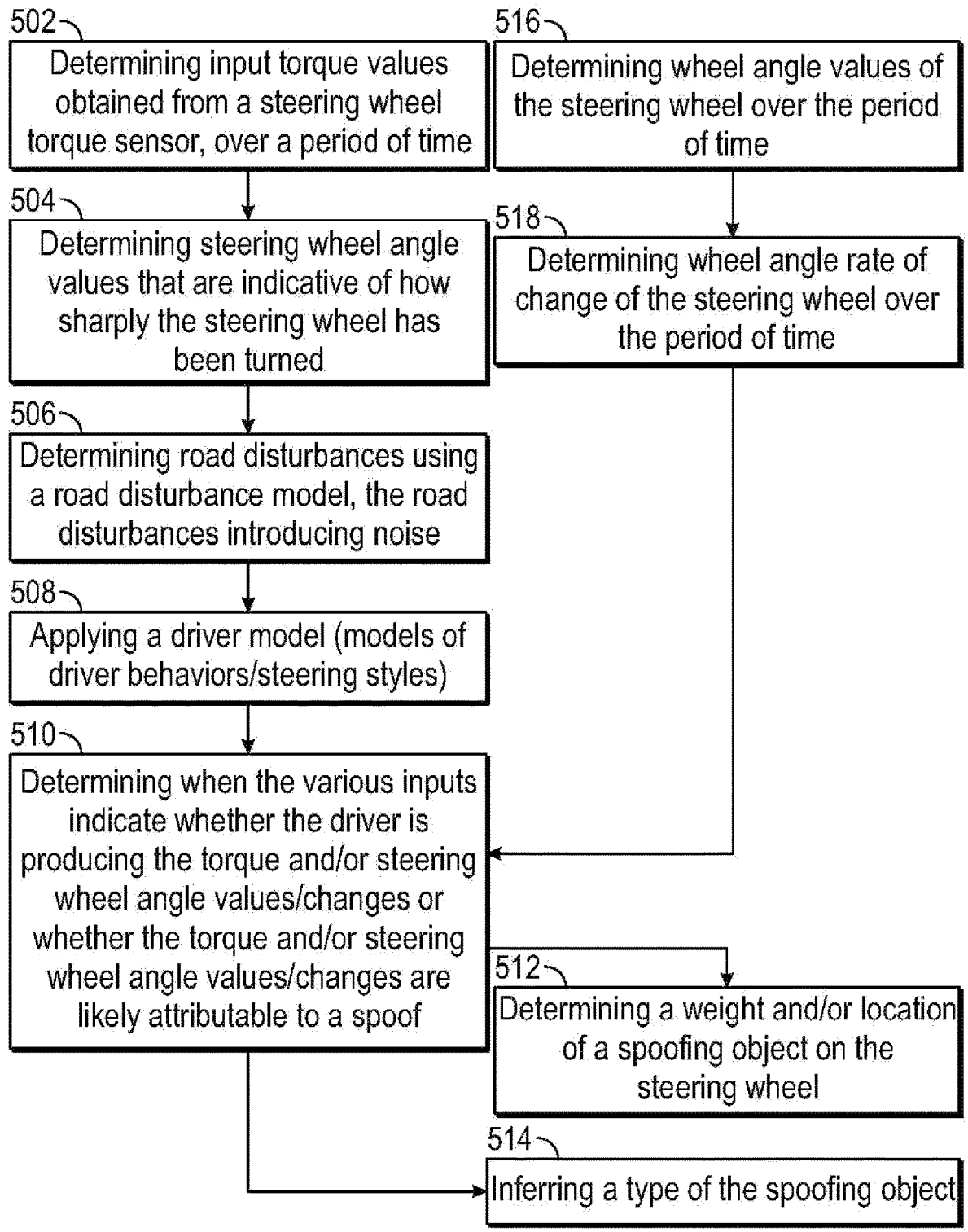
FIG. 5 is a flowchart of an example method of the present disclosure.

FIG. 5 is a flowchart of an example method of the present disclosure. The method can include a step 502 of determining input torque values obtained from a steering torque sensor. It will be understood that these torque values are obtained over a period of time. For example, the torque values can be obtained over one-minute increments, but other time frames can also be used. In addition to using input torque values, torque statistics can also be used.

The method can include a step 504 of determining steering wheel angle values that are indicative of how sharply the steering wheel has been turned. These steering wheel angle values are also obtained over the relevant time period used in step 502 and can be sensed using a steering wheel angle sensor. The method can include a step 506 of determining road disturbances using a road disturbance model. As noted above, the road disturbance model can be generated from vehicle sensors such as cameras, which can detect likely road disturbances such as holes, bumps, road topology, and the like. The road disturbance model can also integrate information from a map.

The method can include a step 508 of applying a driver model. As noted above, the driver model can be created by training a model using one or more human drivers. The behaviors of the drivers are analyzed over time and are correlated with various road conditions and driving parameters and steering responses/styles can be identified. Various permutations data obtained from steps 502-508 can be used as input into a processor that can apply an analytical model, neural network, gradient boosted tree, anomaly detection algorithm(s). The method includes a step 510 of the processor determining when the various inputs indicate whether the driver is producing the torque and/or steering wheel angle values/changes or whether the torque and/or steering wheel angle values/changes are likely attributable to a spoof. In some instances, more particular information can be gathered. For example, the method can include a step 512 of determining a weight and/or location of a spoofing object on the steering wheel. In some instances, the method can include a step 514 of inferring a type of the spoofing object. For example, a water bottle wedged into a steering wheel may produce different torque and steering wheel angle values than a weight that is suspended from the steering wheel. In some embodiments, the method can include a step 516 of determining wheel angle values of the steering wheel over the period of time, as well as a step 518 of determining wheel angle rate of change of the steering wheel over the period of time. Again, the wheel angle values and the wheel angle rate of change can be used in determining when input torque values are indicative of a spoof or human interaction. Thus, these steps can occur prior to step 510.

In step 520, the method includes a step of executing an automatic steering response or remediation upon detection of the spoofing object. For example, when the spoofing object is detected, the vehicle can automatically briefly overtake steering control to ensure that the vehicle stays centered in its lane, as well as outputting a warning to the driver to remove the spoofing object. In some instances, only the warning may be given to the driver. In yet other examples, another automated response may be to slow the vehicle or cause the vehicle to move onto a shoulder or into a parking location (such as when the vehicle is in an urban area).

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method comprising:
   determining input torque values obtained from a steering torque sensor associated with a steering input mechanism of a vehicle, wherein the input torque values are obtained over a period of time;
   determining road disturbances using a road disturbance model;
   filtering noise from the input torque values, the noise being inferred from the road disturbance model, the noise being created from road and/or environmental conditions;
   applying a driver model that is indicative of human driver hands-on-wheel behaviors;
   determining when input torque values are indicative of a spoof or human interaction with the steering input mechanism using the input torque values, the road disturbance model, and the driver model; and
   executing a remediating measure when the input torque values are indicative of the spoof.

2. The method according to claim 1, further comprising generating the road disturbance model from sensor output obtained from a vehicle sensor platform that comprises at least one camera, the sensor output being images obtained by the at least one camera.

3. The method according to claim 1, further comprising:
   determining angle values of the steering input mechanism over the period of time; and
   determining an angle rate of change of the steering input mechanism over the period of time, the angle values and the angle rate of change being used in determining when input torque values are indicative of the spoof or human interaction.

4. The method according to claim 1, wherein the remediating measure includes displaying a warning message on a human-machine interface of the vehicle.

5. The method according to claim 1, wherein the remediating measure includes causing an advanced driver assistance system of the vehicle to slow the vehicle or deactivate a fully or semi-autonomous mode of steering.

6. The method according to claim 1, wherein the input torque values are indicative of the human interaction when the input torque values are quasi-random and the input torque values are indicative of the spoof when the input torque values are cyclical.

7. The method according to claim 1, further comprising determining and applying vehicle acceleration values over the period of time.

8. The method according to claim 1, further comprising determining when the spoof is created by a device associated with the steering input mechanism.

9. A vehicle, comprising:
a steering wheel of the vehicle;
a steering torque sensor coupled to the steering wheel; and
an advance driver assistance system (ADAS), comprising a processor and memory, the processor executing instructions stored in the memory to:
determine input torque values obtained from the steering torque sensor associated with the steering wheel of the vehicle, wherein the input torque values are obtained over a period of time;
determine road disturbances using a road disturbance model;
filter noise from the input torque values, the noise being inferred from the road disturbance model, the noise being created from road conditions;
apply a driver model that is indicative of human driver hands-on-wheel behaviors;
determine when input torque values are indicative of a spoof or human interaction with the steering wheel using the input torque values, the road disturbance model, and the driver model; and
execute a remediating measure when the input torque values are indicative of the spoof.

10. The vehicle according to claim 9, further comprising a vehicle sensor platform that comprises at least a camera, the ADAS being configured to generate the road disturbance model from images obtained from the camera, the ADAS using a modeling engine that applies image processing logic to detect road disturbances in the images.

11. The vehicle according to claim 9, wherein the ADAS is configured to:
determine wheel angle values of the steering wheel over the period of time; and
determine wheel angle rate of change of the steering wheel over the period of time, the wheel angle values and the wheel angle rate of change being used in determining when input torque values are indicative of the spoof or human interaction.

12. The vehicle according to claim 9, wherein the remediating measure includes the ADAS causing a warning message to be displayed on a human-machine interface of the vehicle.

13. The vehicle according to claim 9, wherein the remediating measure includes the ADAS slowing the vehicle or deactivate a fully or semi-autonomous mode of steering.

14. The vehicle according to claim 9, wherein the input torque values are indicative of the human interaction when the input torque values are quasi-random and the input torque values are indicative of the spoof when the input torque values are cyclical.

15. The vehicle according to claim 9, wherein the ADAS is configured to determine and apply vehicle acceleration values over the period of time.

16. The vehicle according to claim 9, wherein the ADAS is configured to determine when the spoof is created by a device associated with the steering wheel.

17. A method comprising:
determining input torque values obtained from a steering torque sensor associated with a steering wheel of a vehicle, wherein the input torque values are obtained over a period of time;
filtering out a road disturbances using a road disturbance model, the road disturbances introducing noise into the input torque values;
applying a driver model that is indicative of human driver hands-on-wheel behaviors;
determining wheel angle values of the steering wheel over the period of time;
determining wheel angle rate of change of the steering wheel over the period of time, the wheel angle values and the wheel angle rate of change being used in determining when input torque values are indicative of a spoof or human interaction
determining when input torque values are indicative of the spoof or human interaction with the steering wheel using the input torque values, the road disturbance model, and the driver model, the wheel angle values, and the wheel angle rate of change; and
executing a remediating measure when the input torque values are indicative of the spoof.

18. The method according to claim 17, wherein the remediating measure includes slowing the vehicle or deactivate a fully or semi-autonomous mode of steering.

* * * * *